United States Patent
Garsuch et al.

(10) Patent No.: US 10,249,906 B2
(45) Date of Patent: Apr. 2, 2019

(54) USE OF FLUOROISOPROPYL DERIVATIVES AS ADDITIVES IN ELECTROLYTES

(71) Applicant: BASF SE, Ludwigshafen (DE)

(72) Inventors: Arnd Garsuch, Ludwigshafen (DE); Michael Schmidt, Seeheim-Jugenheim (DE); Siegfried R. Waldvogel, Gau-Algesheim (DE); Robert Francke, Santa Barbara, CA (US)

(73) Assignee: BASF SE, Ludwigshafen (DE)

( * ) Notice: Subject to any disclaimer, the term of this patent is extended or adjusted under 35 U.S.C. 154(b) by 379 days.

(21) Appl. No.: 14/433,818

(22) PCT Filed: Dec. 6, 2013

(86) PCT No.: PCT/EP2013/075740
§ 371 (c)(1),
(2) Date: Apr. 6, 2015

(87) PCT Pub. No.: WO2014/095407
PCT Pub. Date: Jun. 26, 2014

(65) Prior Publication Data
US 2015/0236380 A1    Aug. 20, 2015

(30) Foreign Application Priority Data
Dec. 18, 2012  (EP) .................................... 12197891

(51) Int. Cl.
| | | |
|---|---|---|
| H01M 10/00 | (2006.01) | |
| H01M 10/0567 | (2010.01) | |
| H01M 10/0569 | (2010.01) | |
| H01M 10/0525 | (2010.01) | |
| H01M 4/136 | (2010.01) | |
| H01M 4/58 | (2010.01) | |
| H01M 4/131 | (2010.01) | |
| H01M 4/505 | (2010.01) | |
| H01M 4/525 | (2010.01) | |
| H01M 4/02 | (2006.01) | |

(52) U.S. Cl.
CPC ....... *H01M 10/0567* (2013.01); *H01M 4/131* (2013.01); *H01M 4/136* (2013.01); *H01M 4/505* (2013.01); *H01M 4/525* (2013.01); *H01M 4/5825* (2013.01); *H01M 10/0525* (2013.01); *H01M 10/0569* (2013.01); *H01M 2004/028* (2013.01); *H01M 2300/0034* (2013.01)

(58) Field of Classification Search
CPC ......... H01M 10/0567; H01M 10/0569; H01M 10/0525
See application file for complete search history.

(56) References Cited

U.S. PATENT DOCUMENTS

| | | |
|---|---|---|
| 3,359,296 A | 12/1967 | Newallis, et al. |
| 5,626,981 A | 5/1997 | Simon et al. |
| 5,633,099 A | 5/1997 | Yokoyama et al. |
| 5,659,062 A | 8/1997 | Yokoyama et al. |
| 5,847,188 A | 12/1998 | Yokoyama et al. |
| 6,506,524 B1 | 1/2003 | McMillan et al. |
| 2004/0096749 A1 | 5/2004 | Kim et al. |

(Continued)

FOREIGN PATENT DOCUMENTS

| | | |
|---|---|---|
| CN | 1501540 A | 6/2004 |
| CN | 101218706 A | 7/2008 |

(Continued)

OTHER PUBLICATIONS

Machine translation of JP 2012-064472 (JP application No. 2010-208443) obtained May 9, 2017.*
U.S. Appl. No. 14/412,811, filed Jan. 5, 2015, Garsuch, et al.
International Search Report dated Jan. 31, 2014 in PCT/EP2013/075740.
M. C. Smart, et al., "Improved Performance of lithium-ion cells with the use of fluorinated carbonate-based electrolytes", Journal of power Sources, 119-121, 2003, pp. 359-367.
H.J. Santner et al., "Acrylic acid nitrile, a film-forming electrolyte component for lithium-ion batteries, which belongs to the family of additives containing vinyl groups", Journal of Power Sources, 119-121, 2003, pp. 368-372.
Koji Abe et al., "Functional Electrolytes Triple-Bonded Compound as an Additive for Negative Electrode", Journal of the Electrochemical Society, 2007, vol. 154, Issue 8, pp. A810-A815.

(Continued)

*Primary Examiner* — Nicholas P D'Aniello
(74) *Attorney, Agent, or Firm* — Oblon, McClelland, Maier & Neustadt, L.L.P.

(57) ABSTRACT

An electrolyte composition (A) containing (i) at least one aprotic organic solvent; (ii) at least one conducting salt; (iii) at least one compound of formula (I) wherein $A^1, A^2, A^3, A^4, A^5$, and $A^6$ are independently from each other selected from H and F, wherein at least one of the group $A^1, A^2, A^3, A^4, A^5$, and $A^6$ is F; R is selected from $R^1$, and $C(O)OR^1$, and $R^1$ is selected from $C_1$-$C_6$ alkyl, $C_3$-$C_6$ cycloalkyl, $C_2$-$C_6$ alkenyl, $C_3$-$C_6$ cycloalkenyl, $C_5$-$C_7$ (hetero)aryl, and $C_2$-$C_6$ alkinyl, wherein alkyl, cycloalkyl, alkenyl, cycloalkenyl, (hetero)aryl, and alkinyl may be substituted by one or more F; and (iv) optionally at least one further additive.

(I)

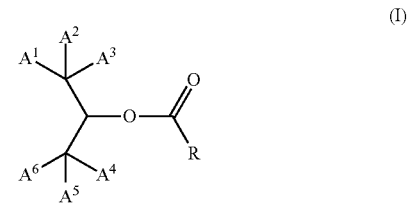

11 Claims, No Drawings

(56) References Cited

U.S. PATENT DOCUMENTS

| | | | |
|---|---|---|---|
| 2006/0078801 A1 | 4/2006 | Yamaguchi et al. | |
| 2010/0047695 A1 | 2/2010 | Smart et al. | |
| 2013/0261248 A1* | 10/2013 | Nakano | H01G 7/021 |
| | | | 524/546 |
| 2014/0193707 A1 | 7/2014 | Schmidt et al. | |

FOREIGN PATENT DOCUMENTS

| | | | |
|---|---|---|---|
| EP | 0 599 534 A1 | 6/1994 | |
| EP | 1 890 357 A1 | 2/2008 | |
| JP | 2001-256998 | 9/2001 | |
| JP | 2006-32300 | 2/2006 | |
| JP | 2012-64472 | 3/2012 | |
| JP | WO 2012074115 A1 * | 6/2012 | ............. H01G 7/021 |

OTHER PUBLICATIONS

Rod McMillan et al., "Fluoroethylene carbonate electrolyte and its use in lithium ion batteries with graphite anodes", Journal of Power Sources, 1999, pp. 20-26.

Nam-Soon Choi et al., "Effect of fluoroethylene carbonate additive on interfacial properties of silicon thin-film electrode", Journal of Power Sources, 2006, vol. 161, pp. 1254-1258.

Hans-Joachim Kötzsch, "Darstellung Und Charakterisierung von 2H-Hexafluor-propanol-(2)", Chem. Ber., 1966, pp. 1143-1148.

John J. Parlow, et al., "Utility of Complementary Molecular Reactivity and Molecular Recognition (CMR/R) Technology and Polymer-Supported Reagents in the Solution-Phase Synthesis of Heterocyclic Carboxamides", J. Org. Chem., 1997, vol. 62, pp. 5908-5919.

Ran Elazari et al., "Rechargeable lithiated silicon-sulfur (SLS) battery prototypes", Electrochemistry Communicaitons, 2012, vol. 14, pp. 21-24.

* cited by examiner

USE OF FLUOROISOPROPYL DERIVATIVES AS ADDITIVES IN ELECTROLYTES

The present invention relates to an electrolyte composition (A) containing
(i) at least one aprotic organic solvent;
(ii) at least one conducting salt;
(iii) at least one compound of formula (I)

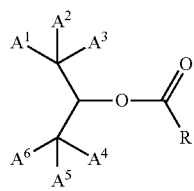

wherein
$A^1, A^2, A^3, A^4, A^5$, and $A^6$ are independently from each other selected from H and F, wherein at least one of the group $A^1, A^2, A^3, A^4, A^5$, and $A^6$ is F;
R is selected from $R^1$, and $C(O)OR^1$, and
$R^1$ is selected from $C_1$-$C_6$ alkyl, $C_3$-$C_6$ cycloalkyl, $C_2$-$C_6$ alkenyl, $C_3$-$C_6$ cycloalkenyl, $C_5$-$C_7$ (hetero)aryl, and $C_2$-$C_6$ alkinyl, wherein alkyl, cycloalkyl, alkenyl, cycloalkenyl, (hetero)aryl, and alkinyl may be substituted by one or more F; and
(iv) optionally at least one further additive.

The present invention further relates to the use of compounds of formula (I) as additives in electrolytes for electrochemical cells and to electrochemical cells comprising the inventive electrolyte composition (A).

Storing energy has long been a subject of growing interest. Electrochemical cells, for example batteries or accumulators, can serve to store electrical energy. Lithium ion batteries have attracted particular interest since they are superior to the conventional batteries in several technical aspects. For instance, they provide higher energy densities than accumulators based on lead or comparatively noble heavy metals.

During charge and discharge of lithium ion batteries various reactions take place at different cell potentials. It is known that during the first charging process of a lithium ion battery usually a film is formed on the anode. This film is often called solid electrolyte interface (SEI). The SEI is permeable for lithium ions and protects the electrolyte from direct contact with the anode and vice versa. It is formed by reductive decomposition of components of the electrolyte composition like solvents, e.g. carbonates, esters, ethers and conductive salts on the surface of the anode, especially if the anode active material is a carbonaceous material like graphite. A certain amount of the lithium from the cathode is irreversibly consumed for the formation of the SEI and cannot be replaced. One possibility to reduce the amount of irreversibly consumed lithium is the addition of suitable chemical compounds which are easily decomposed on the anode by reduction and thereby forming a film on the surface of the anode. One well-known compound is vinylene carbonate, see for instance U.S. Pat. No. 5,626,981. Vinylene carbonate forms a stable SEI on a graphite anode in lithium ion batteries. Santner et al., J. Power Sources, 2003, 119 to 121, pages 368 to 372 reports the use of acrylonitrile in propylene carbonate as film forming additive in lithium ion secondary batteries having a graphite anode and $LiMn_2O_4$ as cathode active material. K. Abe et al., J. Electrochem. Soc., 2007, 154 (8), pages A810 to A815 describes the use of triple-bonded compounds like propargyl methane sulfonate and propargyl methyl carbonate in 1 M $LiPF_6$ [ethylene carbonate/methylethylcarbonate] and [propylene carbonate/methylethylcarbonate]. The use of fluoroethylene carbonate as electrolyte component in lithium-ion batteries with graphite anodes was proposed by R. McMillan et al., J. Power Sources, 1999, 81 to 82, pages 20 to 26 and U.S. Pat. No. 6,506,524. A SEI is also formed on silicon containing anode active materials. According to N. S. Choi et al., J. Power Source, 2006, 161, pages 1254 to 1258, a less porous SEI layer structure is generated on a silicon thin film anode by the introduction of fluoroethylene carbonate as additive to 1 M $LiPF_6$ [ethylene carbonate/diethylethylcarbonate] electrolyte composition. The discharge capacity retention of a Si/Li-half cell is improved by the addition of fluorethylene carbonate. Nevertheless, the demand for suited additives for lithium ion secondary batteries is still present.

A further problem is the low and the high temperature performance of lithium ion batteries. Organic solvents used in lithium ion secondary batteries, in general, have a high dielectric constant and a low viscosity, and therefore increase ionic dissociation by promoting ionic conductance. In order to obtain an electrolyte solution having desired dielectric constant and viscosity, a mixture of at least two carbonates is usually used, wherein one of said carbonates has a high dielectric constant and viscosity, and the other one of said at least one solvent has a low dielectric constant and viscosity. In particular cases, such mixtures consist of a cyclic carbonate(s) and a linear carbonate(s), wherein the ratio between the cyclic and linear carbonates in the mixture is determined so as to obtain a desired dielectric constant and viscosity. Due to its chemical properties ethylene carbonate is usually used as cyclic carbonate despite the fact that it has a high melting point (36° C.) and decomposes at 242° C. In contrast the cyclic carbonate propylene carbonate has a low melting point (−48.8° C.) and is thermally more stable (boiling point: 248° C.). Unfortunately propylene carbonate has a particular detrimental effect on graphite anodes; it co-intercalates together with the Lithium ions into the graphite thereby exfoliating and destroying the graphite structure. It would be desirable to provide suited electrolyte additives which allow the use of propylene carbonate in combination with carbonaceous anode active materials in order to obtain electrolytes usable in a broader temperature range.

It was thus an object of the present invention to provide an additive for electrolytes for lithium ion batteries enhancing the long time stability of the electrolyte composition and of the lithium ion battery. It was another object of the present invention to provide an additive for electrolytes for lithium ion batteries which allows using the electrolyte composition and the lithium ion battery in a broader temperature range.

This object is achieved by an electrolyte composition (A) containing
(i) at least one aprotic organic solvent;
(ii) at least one conducting salt;
(iii) at least one compound of formula (I)

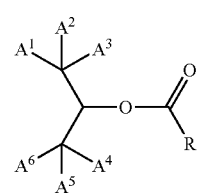

wherein

A$^1$, A$^2$, A$^3$, A$^4$, A$^5$, and A$^6$ are independently from each other selected from H and F, wherein at least one of the group A$^1$, A$^2$, A$^3$, A$^4$, A$^5$, and A$^6$ is F;

R is selected from R$^1$ and C(O)OR$^1$, and

R$^1$ is selected from C$_1$-C$_6$ alkyl, C$_3$-C$_6$ cycloalkyl, C$_2$-C$_6$ alkenyl, C$_3$-C$_6$ cycloalkenyl, C$_5$-C$_7$ (hetero)aryl, and C$_2$-C$_6$ alkinyl, wherein alkyl, cycloalkyl, alkenyl, cycloalkenyl, (hetero)aryl, and alkinyl may be substituted by one or more F; and (iv) optionally at least one further additive;

by the use of compounds of formula (I) as additives in electrolytes and by electrochemical cells comprising the inventive electrolyte composition.

The electrolyte composition according to the present invention containing at least one compound of formula (I) shows improved retention of discharge capacity.

The electrolyte composition (A) contains as component (iii) at least one compound of formula (I) as defined above.

The term "C$_1$-C$_6$ alkyl" as used herein typically means a straight or branched saturated hydrocarbon radical having 1 to 6 carbon atoms and includes, e.g., methyl, ethyl, n-propyl, isopropyl, n-butyl, sec-butyl, isobutyl, tert-butyl, n-pentyl, iso-pentyl, 2,2-dimethylpropyl, n-hexyl, iso-hexyl and the like. Preferred are C$_1$-C$_4$ alkyl groups, more preferred are 2-propyl, methyl and ethyl.

The term "C$_3$-C$_6$ cycloalkyl" as used herein typically means a cyclic saturated hydrocarbon radical having 3 to 6 carbon atoms and includes, e.g. cyclopropyl, cyclobutyl, cyclopentyl and cyclohexyl.

The term "C$_2$-C$_6$ alkenyl" as used herein typically refers to an unsaturated straight or branched hydrocarbon radical having 2 to 6 carbon atoms, i.e. the hydrocarbon radical contains at least one C—C double bond. C$_2$-C$_6$ alkenyl includes for example ethenyl, 1-propenyl, 2-propenyl, 1-n-butenyl, 2-n-butenyl, iso-butenyl, 1-pentenyl, 1-hexenyl and the like.

The term "C$_3$-C$_6$ cycloalkenyl" as used herein typically means a cyclic unsaturated hydrocarbon radical having 3 to 6 carbon atoms and includes, e.g. cyclopropenyl, cyclobutenyl, cyclopentenyl and cyclohexenyl.

The term "C$_2$-C$_6$ alkinyl" as used herein typically refers to an unsaturated straight or branched hydrocarbon radical having 2 to 6 carbon atoms, wherein the hydrocarbon radical contains at least one C—C triple bond. C$_2$-C$_6$ alkinyl includes for example ethinyl, 1-propinyl, 2-propinyl, 1-n-butinyl, 2-n-butinyl, iso-butinyl, 1-pentinyl, 1-hexinyl and the like.

The term "C$_5$-C$_7$ (hetero) aryl" as used herein denotes an aromatic 5- to 7-membered hydrocarbon cycle wherein at least one C-atom may be replaced by N, O or S. A preferred C$_5$-C$_7$ aryl is phenyl, examples of C$_5$-C$_7$ hetero aryl are pyrrolyl, furanyl, thiophenyl, pyridinyl, pyranyl, thiopyranyl and the like.

A$^1$, A$^2$, A$^3$, A$^4$, A$^5$, and A$^6$ are selected from H and F, wherein at least one of the group consisting of A$^1$, A$^2$, A$^3$, A$^4$, A$^5$, and A$^6$ is F. Preferably at least two of the group consisting of A$^1$, A$^2$, A$^3$, A$^4$, A$^5$, and A$^6$ are F, in particular preferred all A$^1$, A$^2$, A$^3$, A$^4$, A$^5$, and A$^6$ are F.

R$^1$ is preferably C$_1$-C$_6$ alkyl, i.e. R is preferably selected from C$_1$-C$_6$ alkyl and C(O)OC$_1$-C$_6$ alkyl wherein alkyl may be substituted by one or more F. According to a particular preferred embodiment R is selected from C(O)OR$^1$ wherein R$^1$ is 2-propyl which is substituted in 1- and/or 3-position by at least 1 F and up to 6 F. This includes R$^1$ being 1-fluoro-2-propyl, 1,1-difluoro-2-propyl, 1,1,1-trifluoro-2-propyl, 1,3-difluoro-2-propyl, 1,1,3,3-tetrafluoro-2-propyl and 1,1,1,3,3,3-hexafluoro-2-propyl and the like.

Preference is given especially to compounds of formula (I) wherein all A$^1$, A$^2$, A$^3$, A$^4$, A$^5$, and A$^6$ are F and R$^1$ is C$_1$-C$_6$ alkyl, i.e. R is preferably selected from C$_1$-C$_6$ alkyl and C(O)OC$_1$-C$_6$ alkyl wherein alkyl may be substituted by one or more F. Within this embodiment it is further preferred if R is selected from C(O)OR$^1$ with R$^1$ is 2-propyl substituted in 1- and/or 3-position by at least 1 F and up to 6 F, and most preferred if R$^1$ is 1,1,1,3,3,3-hexafluoro-2-propyl.

Especially preferred compounds of formula (I) are di-(1,1,1,3,3,3-hexafluoro-2-propyl)oxalate, (1,1,1,3,3,3-hexafluoro-2-propyl)acetate, and propionic acid (1,1,1,3,3,3-hexafluoroisopropyl)ester.

The preparation of compounds of formula (I) is known to the person skilled in the art. They may be prepared from fluorinated 2-propanol derivatives like 1,1,1,3,3,3-hexafluoro-2-propanol and phosgene, oxalyl chloride, carboxylic acid anhydride, alkyl chloroformates and other starting materials. Descriptions of the preparation of compounds of formula (I) can be found in H. J. Kötzsch, Chem. Ber. 1966, pages 1143 to 1148, U.S. Pat. No. 3,359,296, and J. J. Parlow et al., J. Org. Chem. 1997, 62, pages 5908 to 5919.

The electrolyte composition (A) further contains at least one aprotic organic solvent (i), preferably at least two aprotic organic solvents (ii) and more preferred at least three aprotic organic solvents (i). According to one embodiment the electrolyte composition (A) may contain up to ten aprotic organic solvents (i).

The at least one aprotic organic solvent (i) is preferably selected from (a) cyclic and noncyclic organic carbonates, which may be partly halogenated, (b) di-C$_1$-C$_{10}$-alkylethers, which may be partly halogenated, (c) di-C$_1$-C$_4$-alkyl-C$_2$-C$_6$-alkylene ethers and polyethers, which may be partly halogenated, (d) cyclic ethers, which may be partly halogenated, (e) cyclic and acyclic acetales and ketales, which may be partly halogenated, (f) orthocarboxylic acids esters, which may be partly halogenated, (g) cyclic and noncyclic esters of carboxylic acids, which may be partly halogenated, (h) Cyclic and noncyclic sulfones, which may be partly halogenated, (i) Cyclic and noncyclic nitriles and dinitriles, which may be partly halogenated, and (j) Ionic liquids, which may be partly halogenated.

The aprotic organic solvents (a) to (j) may be partly halogenated, e.g. they may be partly fluorinated, partly chlorinated or partly brominated, and preferably they may be partly fluorinated. "Partly halogenated" means, that one or more H of the respective molecule is substituted by a halogen atom, e.g. by F, Cl or Br. Preference is given to the substitution by F. The at least one solvent (i) may be selected from partly halogenated and non-halogenated aprotic organic solvents (a) to (j), i.e. the electrolyte composition may contain a mixture of partly halogenated and non-halogenated aprotic organic solvents.

More preferred the at least one aprotic organic solvent (i) is selected from cyclic and noncyclic organic carbonates (a), di-C$_1$-C$_{10}$-alkylethers (b), di-C$_1$-C$_4$-alkyl-C$_2$-C$_6$-alkylene ethers and polyethers (c) and cyclic and acyclic acetales and ketales (e), even more preferred electrolyte composition (A) contains at least one aprotic organic solvent (i) selected from cyclic and noncyclic organic carbonates (a) and most preferred electrolyte composition (A) contains at least two aprotic organic solvents (i) selected from cyclic and non-cyclic organic carbonates (a), in particular electrolyte composition (A) contains at least one cyclic organic carbonate (a) and at least one noncyclic organic carbonate (a) e.g. ethylene carbonate and diethylcarbonate. The aforementioned preferred organic aprotic solvents may be also partly halogenated, preferably partly fluorinated.

Examples of suitable organic carbonates (a) are cyclic organic carbonates according to the general formula (a1), (a2) or (a3)

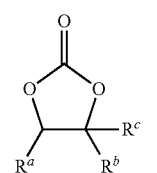

(a1)

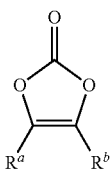

(a2)

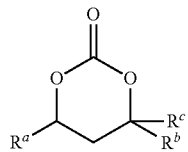

(a3)

wherein
$R^a$, $R^b$ and $R^c$ being different or equal and being independently from each other selected from hydrogen; $C_1$-$C_4$-alkyl, preferably methyl; F; and $C_1$-$C_4$-alkyl substituted by one or more F, e.g. $CF_3$.

"$C_1$-$C_4$-alkyl" is intended to include methyl, ethyl, n-propyl, iso-propyl, n-butyl, iso-butyl, sec.-butyl and tert.-butyl.

Preferred cyclic organic carbonates (a) are of general formula (a1), (a2) or (a3) wherein $R^a$, $R^b$ and $R^c$ are H. Examples are ethylene carbonate, vinylene carbonate, and propylene carbonate. A preferred cyclic organic carbonate (a) is ethylene carbonate. Further preferred cyclic organic carbonate (a) are difluoroethylene carbonate (a4) and monofluoroethylene carbonate (a5)

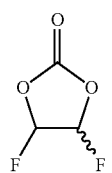

(a4)

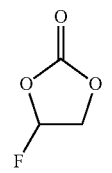

(a5)

Examples of suitable non-cyclic organic carbonates (a) are dimethyl carbonate, diethyl carbonate, methylethyl carbonate and mixtures thereof.

In one embodiment of the invention the electrolyte composition (A) contains mixtures of non-cyclic organic carbonates (a) and cyclic organic carbonates (a) at a ratio by weight of from 1:10 to 10:1, preferred of from 3:1 to 1:1.

According to a particular preferred embodiment of the present invention the at least one aprotic organic solvent (i) is selected from ethylene carbonate and mixtures of ethylene carbonate with one or more of the aprotic organic solvents (a) to (j), preferably from ethylene carbonate and mixtures of ethylene carbonate with further non-cyclic and/or cyclic organic carbonates (a) since the compounds of formula (I) are especially effective in combination with ethylene carbonate.

Examples of suitable non-cyclic di-$C_1$-$C_{10}$-alkylethers (b) are dimethylether, ethylmethylether, diethylether, diisopropylether, and di-n-butylether.

Examples of di-$C_1$-$C_4$-alkyl-$C_2$-$C_6$-alkylene ethers (c) are 1,2-dimethoxyethane, 1,2-diethoxyethane, diglyme (diethylene glycol dimethyl ether), triglyme (triethylenglycol dimethyl ether), tetraglyme (tetraethylenglycol dimethyl ether), and diethylenglycoldiethylether.

Examples of suitable polyethers (c) are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of suitable cyclic ethers (d) are tetrahydrofurane and 1,4-dioxane.

Examples of suitable non-cyclic acetals (e) are 1,1-dimethoxymethane and 1,1-diethoxymethane. Examples for suitable cyclic acetals (e) are 1,3-dioxane and 1,3-dioxolane.

Examples of suitable orthocarboxylic acids esters (f) are tri-$C_1$-$C_4$ alkoxy methane, in particular trimethoxymethane and triethoxymethane.

Examples of suitable noncyclic esters of carboxylic acids (g) are ethyl acetate, methyl butanoate, esters of dicarboxylic acids like 1,3-dimethyl propanedioate. An example of a suitable cyclic ester of carboxylic acids (lactones) is γ-butyrolactone.

Examples of suitable noncyclic sulfones (h) are ethyl methyl sulfone and dimethyl sulfone.

Examples of suitable cyclic and noncyclic nitriles and dinitriles (i) are adipodinitrile, acetonitrile, propionitrile, and butyronitrile.

The inventive electrolyte composition (A) furthermore contains at least one conducting salt (ii). Electrolyte composition (A) functions as a medium that transfers the ions participating in the electrochemical reaction taking place in the electrochemical cell. The conducting salt(s) (ii) present in the electrolyte are usually solvated in the aprotic organic solvent(s) (i). Preferably the conducting salt (ii) is a lithium salt. The conducting salt is preferably selected from the group consisting of Li[F$_{6-x}$P(C$_y$F$_{2y+1}$)$_x$], wherein x is an integer in the range from 0 to 6 and y is an integer in the range from 1 to 20;

Li[B(R$^2$)$_4$], Li[B(R$^2$)$_2$(OR$^3$O)] and Li[B(OR$^3$O)$_2$], wherein each R$^2$ is independently from each other selected from F, Cl, Br, I, C$_1$-C$_4$ alkyl, C$_2$-C$_4$ alkenyl, and C$_2$-C$_4$ alkinyl, wherein alkyl, alkenyl, and alkinyl may be substituted by one or more OR$^4$, wherein R$^4$ is selected from C$_1$-C$_6$ alkyl, C$_2$-C$_6$ alkenyl, and C$_2$-C$_6$ alkinyl, and wherein (OR$^3$O) is a bivalent group derived from a 1,2- or 1,3-diol, from a 1,2- or 1,3-dicarboxlic acid or from a 1,2- or 1,3-hydroxycarboxylic acid, wherein the bivalent group forms a 5- or 6-membered cycle via the both oxygen atoms with the central B-atom;

salts of the general formula Li[X(C$_n$F$_{2n+1}$SO$_2$)$_m$], where m and n are defined as follows:

m=1 when X is selected from oxygen and sulfur,
m=2 when X is selected from nitrogen and phosphorus,
m=3 when X is selected from carbon and silicon, and
n is an integer in the range from 1 to 20, LiClO$_4$; LiAsF$_6$; LiCF$_3$SO$_3$; Li$_2$SiF$_6$; LiSbF$_6$; LiAlCl$_4$, lithium tetrafluoro (oxalato) phosphate; and lithium oxalate.

Suited 1,2- and 1,3-diols from which the bivalent group (OR$^3$O) is derived may be aliphatic or aromatic and may be selected, e.g., from 1,2-dihydroxybenzene propane-1,2-diol, butane-1,2-diol, propane-1,3-diol, butan-1,3-diol, cyclohexyl-trans-1,2-diol or naphthalene-2,3-diol which are optionally are substituted by one or more F and/or by at least one straight or branched non fluorinated, partly fluorinated or fully fluorinated C$_1$-C$_4$ alkyl group. An example for such 1,2- or 1,3-diol is 1,1,2,2-tetra(trifluoromethyl)-1,2-ethane diol.

Suited 1,2- or 1,3-dicarboxlic acids from which the bivalent group (OR$^3$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acids are optionally are substituted by one or more F and/or by at least one straight or branched non fluorinated, partly fluorinated or fully fluorinated C$_1$-C$_4$ alkyl group.

Suited 1,2- or 1,3-hydroxycarboxylic acids from which the bivalent group (OR$^3$O) is derived may be aliphatic or aromatic, for example salicylic acid, tetrahydro salicylic acid, malic acid, 2-hydroxy acetic acid, which are optionally are substituted by one or more F and/or by at least one straight or branched non fluorinated, partly fluorinated or fully fluorinated C$_1$-C$_4$ alkyl group. An example for such 1,2- or 1,3-hydroxycarboxylic acids is 2,2-bis(trifluoromethyl)-2-hydroxy-acetic acid.

Examples of Li[B(R$^2$)$_4$], Li[B(R$^2$)$_2$(OR$^3$O)] and Li[B(OR$^3$O)$_2$] are LiBF$_4$, lithium difluoro oxalato borate and lithium dioxalato borate.

Preferably the at least one conducting salt (ii) is selected from LiPF$_6$, LiBF$_4$, and LiPF$_3$(CF$_2$CF$_3$)$_3$, more preferred the conducting salt (ii) is selected from LiPF$_6$ and LiBF$_4$, and the most preferred conducting salt (ii) is LiPF$_6$.

The at least one conducting salt (ii) is usually present at a minimum concentration of at least 0.01 wt.-%, preferably of at least 0.5 wt.-%, more preferred of at least 1 wt.-%, and most preferred of at least 5 wt.-%, based on the total weight of the electrolyte composition. Usually the upper concentration limit for the at least one conducting salt (ii) is 25 wt.-%, based on the total weight of the electrolyte composition.

Moreover, the inventive electrolyte composition (A) may contain at least one further additive (iv). The at least one further additive (iv) may be selected from the group consisting of vinylene carbonate and its derivatives, vinyl ethylene carbonate and its derivatives, methyl ethylene carbonate and its derivatives, lithium (bisoxalato) borate, lithium difluoro (oxalato) borate, lithium tetrafluoro (oxalato) phosphate, lithium oxalate, 2-vinyl pyridine, 4-vinyl pyridine, cyclic exo-methylene carbonates, sultones, cyclic and acyclic sulfonates, cyclic and acyclic sulfites, cyclic and acyclic sulfinates, organic esters of inorganic acids, acyclic and cyclic alkanes having a boiling point at 1 bar of at least 36° C., and aromatic compounds, optionally halogenated cyclic and acyclic sulfonylimides, optionally halogenated cyclic and acyclic phosphate esters, optionally halogenated cyclic and acyclic phosphines, optionally halogenated cyclic and acyclic phosphites including, optionally halogenated cyclic and acyclic phosphazenes, optionally halogenated cyclic and acyclic silylamines, optionally halogenated cyclic and acyclic halogenated esters, optionally halogenated cyclic and acyclic amides, optionally halogenated cyclic and acyclic anhydrides, optionally halogenated organic heterocycles.

Examples of suitable aromatic compounds are biphenyl, cyclohexylbenzene and 1,4-dimethoxy benzene.

Sultones may be substituted or unsubstituted. Examples for suitable sultones are propane sultone (iv a), butane sultone (iv b) and propene sultone (iv c) as shown below:

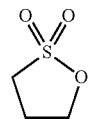
(iv a)

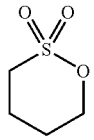
(iv b)

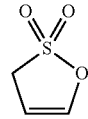
(iv c)

Examples for suitable cyclic exo-methylene carbonates are compound of formula (iv d)

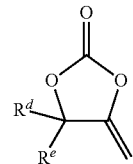
(iv d)

wherein R$^d$ and R$^e$ may be same or different and are independently from each other selected from C$_1$-C$_{10}$ alkyl, and hydrogen. Preferably both R$^d$ and R$^e$ are methyl. Also preferred both R$^d$ and R$^e$ are hydrogen. A preferred cyclic exo-methylene carbonate is methylenethylene carbonate.

Furthermore, additive (iv) may be selected from acyclic or cyclic alkanes, preferably alkanes having at a pressure of 1 bar a boiling point of at least 36° C. Examples of such alkanes are cyclohexane, cycloheptane and cyclododecane.

Further compounds suitable as additives (iv) are organic ester of inorganic acids like ethyl ester or methyl ester of phosphoric acid or sulfuric acid.

Usually additive (iv) is selected to be different from the compounds selected as conducting salt (ii), from the compounds selected as organic aprotic solvents (i) and from compounds selected as compounds of formula (I) (iii) present in the respective electrolyte composition (A).

According to one embodiment of the present invention the electrolyte composition contains at least one further additive (iv). If one or more further additives (iv) are present in the electrolyte composition (A), the total concentration of further additives (iv) is at least 0.001 wt.-%, preferred 0.005 to 10 wt.-% and most preferred 0.01 to 5 wt.-%, based on the total weight of the electrolyte composition (A).

The concentration of the at least one compound of formula (I) in the electrolyte composition (A) is usually 0.001 to 60 wt.-%, preferred 0.01 to 50 wt.-%, more preferred 0.1 to 20 wt.-%, and in particular 1 to 15 wt.-%, based on the total weight of the electrolyte composition (A).

The inventive electrolyte composition is preferably essentially water free, i.e. the water content of the inventive electrolyte composition is below 100 ppm, more preferred below 50 ppm, most preferred below 30 ppm. The term "ppm" denotes parts per million based on the weight of the total electrolyte composition. Various methods are known to the person skilled in the art to determine the amount of water present in the electrolyte composition. A method well suited is the titration according to Karl Fischer, e.g. described in detail in DIN 51777 or ISO760: 1978.

The electrolyte composition (A) of the inventive lithium ion battery is preferably liquid at working conditions; more preferred it is liquid at 1 bar and 25° C., even more preferred the electrolyte composition is liquid at 1 bar and −15° C., most preferred the electrolyte composition is liquid at 1 bar and −30° C., and in particular preferred the electrolyte composition is liquid at 1 bar and −50° C.

In a preferred embodiment of the present invention the electrolyte composition contains at least two aprotic solvents (i) selected from cyclic and noncyclic organic carbonates (a), at least one compound of formula (I), at least one conducting salt (ii) selected from $LiBF_4$ and $LiPF_6$, and at maximum up to 100 ppm water.

Preference is further given to electrolyte composition (A), wherein the electrolyte composition contains (i) from 39.9 to 99.9 wt.-% of the at least one aprotic organic solvent, (ii) from 0.1 to 25 wt.-% of the at least one conducting salt, (iii) from 0.001 to 60 wt.-% of the at least one compound of formula (I), and (iv) from 0 to 10 wt.-% of the at least one further additive, based on the total weight of the electrolyte composition.

Li ion batteries comprising electrolyte composition (A) as described above show increased cycling stability.

A further object of the present invention is the use of one or more compounds of formula (I) as described above in detail as component (iii) of the inventive electrolyte composition (A) as additive in electrolytes for electrochemical cells. Preferably the electrochemical cell is a lithium ion battery. The at least compound of formula (I) is usually used by adding the compound(s) of formula (I) to the electrolyte. Usually the compound of formula (I) is added in amounts yielding electrolyte compositions containing the above described concentrations of compound of formula (I).

Another object of the present invention is an electrochemical cell comprising (A) the electrolyte composition as described above in detail, (B) at least one cathode comprising at least one cathode active material, and (C) at least one anode comprising at least one anode active material.

The inventive electrochemical cell may be a lithium ion battery; an alkali/sulphur battery, e.g. a lithium/sulphur battery or sodium/sulphur battery; or a lithium/selenium sulphur battery.

An alkali metal/sulphur battery comprises as cathode active material sulphur containing materials. The sulphur is usually present as mixture or composite with a conductive material, particularly preferred with carbonaceous conductive materials like carbon black, graphite, expanded graphite, graphen, carbon fibres, carbon nanotubes, activated carbon, carbon prepared by heat treating cork or pitch. It is also possible to use other conductive materials like metal powder, metal flakes, metal compounds or mixtures thereof. Mixtures and composites containing sulphur are often prepared from elemental sulphur.

The alkali metal anode, e.g. a lithium metal or sodium metal anode comprises the alkali metal and/or an alkali metal containing alloy. For lithium/sulphur batteries lithium-aluminium alloys, lithium-tin alloys, Li—Mg-alloys and Li—Ag-alloys may be used.

According to a preferred embodiment of the present invention the electrochemical cell is a lithium ion battery.

In the context of the present invention the term "lithium ion battery" means a rechargeable electrochemical cell wherein during discharge lithium ions move from the negative electrode (anode) to the positive electrode (cathode) and during charge the lithium ions move from the positive electrode to the negative electrode, i.e. the charge transfer is performed by lithium ions. Usually lithium ion batteries comprise as cathode active material a transition metal compound capable of occluding and releasing lithium ions, for example transition metal oxide compounds with layer structure like $LiCoO_2$, $LiNiO_2$, and $LiMnO_2$; transition metal phosphates having olivine structure like $LiFePO_4$ and $LiMnPO_4$; or lithium-manganese spinels which are known to the person skilled in the art in lithium ion battery technology.

The term "cathode active material" denotes the electrochemically active material in the cathode, in the case of lithium ion batteries the cathode active material may be a transition metal oxide intercalating/deintercalating lithium ions during charge/discharge of the battery. Depending on the state of the battery, i.e. charged or discharged, the cathode active material contains more or less lithium ions. The term "anode active material" denotes the electrochemically active material in the anode, in the case of lithium ion batteries the anode active material is a material capable of occluding and releasing lithium ions during charge/discharge of the battery.

The cathode (B) comprised within the electrochemical of the present invention comprises a cathode active material that can reversibly occlude and release lithium ions. Cathode active materials that can be used include, without being limited to, lithiated transition metal phosphates of olivine structure like $LiFePO_4$, $LiCoPO_4$, and $LiMnPO_4$; lithium ion intercalating transition metal oxides with layer structure like $LiMnO_2$, $LiCoO_2$, $LiNiO_2$ and especially those having the general formula $Li_{(1+z)}[Ni_aCo_bMn_c]_{(1-z)}O_{2+e}$ wherein z is 0 to 0.3, a, b and c may be same or different and are independently 0 to 0.8 wherein a+b+c=1 and $-0.1 \leq e \leq 0.1$; and lithiated transition metal mixed oxides of spinel structure.

In one preferred embodiment the cathode active material is $LiCoPO_4$. The cathode containing $LiCoPO_4$ as cathode active material may also be referred to as $LiCoPO_4$ cathode. The $LiCoPO_4$ may be doped with Fe, Mn, Ni, V, Mg, Al, Zr, Nb, TI, Ti, K, Na, Ca, Si, Sn, Ge, Ga, B, As, Cr, Sr, or rare earth elements, i.e., a lanthanide, scandium and yttrium. $LiCoPO_4$ with olivine structure is particularly suited according the present invention due to its high operating voltage (red-ox potential of 4.8 V vs. $Li/Li^+$), flat voltage profile and a high theoretical capacity of about 170 mAh/g. The cathode may comprise a $LiCoPO_4/C$ composite material. The preparation of a suited cathode comprising a $LiCoPO_4/C$ composite material is described in Markevich, Electrochem. Comm. 15, 2012, 22 to 25.

In another preferred embodiment of the present invention the cathode active material is selected from transition metal oxides with layer structure having the general formula $Li_{(1+z)}[Ni_aCo_bMn_c]_{(1-z)}O_{2+e}$ wherein z is 0 to 0.3; a, b and c may be same or different and are independently 0 to 0.8 wherein a+b+c=1; and $-0.1 \leq e \leq 0.1$. Examples for such transition metal oxides with layer structure include those in which $[Ni_aCo_bMn_c]$ is selected from the group $Ni_{0.33}Co_{0.33}Mn_{0.33}$, $Ni_{0.5}Co_{0.2}Mn_{0.3}$, $Ni_{0.33}Co_0Mn_{0.66}$, $Ni_{0.25}Co_0Mn_{0.75}$, $Ni_{0.35}Co_{0.15}Mn_{0.5}$, $Ni_{0.21}Co_{0.08}Mn_{0.71}$ and $Ni_{0.22}Co_{0.12}Mn_{0.66}$. Preferred are transition metal oxides with layer structure having the general formula $Li_{(1+z)}[Ni_aCo_bMn_c]_{(1-z)}O_{2+e}$ wherein z is 0.05 to 0.3, a=0.2 to 0.5, b=0 to 0.3 and c=0.4 to 0.8 wherein a+b+c=1; and $-0.1 \leq e \leq 0.1$. Especially preferred the manganese-containing transition metal oxides with layer structure are selected from those in which $[Ni_aCo_bMn_c]$ is selected from $Ni_{0.33}Co_0Mn_{0.66}$, $Ni_{0.25}Co_0Mn_{0.75}$, $Ni_{0.35}Co_{0.15}Mn_{0.5}$, $Ni_{0.21}Co_{0.08}Mn_{0.71}$ and $Ni_{0.22}Co_{0.12}Mn_{0.66}$, in particular preferred are $Ni_{0.21}Co_{0.08}Mn_{0.71}$ and $Ni_{0.22}Co_{0.12}Mn_{0.66}$.

According to a further preferred embodiment of the present invention the cathode active material is selected from lithiated transition metal mixed oxides of spinel structure. Those are those of general formula $Li_{1+t}M_{2-t}O_{4-d}$ wherein d is 0 to 0.4, t is 0 to 0.4, while more than 60 mol % of M is manganese. Further M's, from which not more than 30 mol % is chosen, are one or more metals from groups 3 to 12 of the periodic table, for example Ti, V, Cr, Fe, Co, Ni, Zn, Mo, with preference being given to Co and Ni, and especially Ni. An example of a suited manganese-containing spinel of the general formula is $LiNi_{0.5}Mn_{1.5}O_{4-d}$.

Many elements are ubiquitous. For example, sodium, potassium and chloride are detectable in certain very small proportions in virtually all inorganic materials. In the context of the present invention, proportions of less than 0.5% by weight of cations or anions are disregarded. Any lithium ion-containing mixed transition metal oxide comprising less than 0.5% by weight of sodium is thus considered to be sodium-free in the context of the present invention. Correspondingly, any lithium ion-containing mixed transition metal oxide comprising less than 0.5% by weight of sulfate ions is considered to be sulfate-free in the context of the present invention.

The cathode may comprise one or more further constituents. For example, the cathode may comprise carbon in a conductive polymorph, for example selected from graphite, carbon black, carbon nanotubes, expanded graphite, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyisoprene and copolymers of at least two comonomers selected from ethylene, propylene, styrene, (meth)acrylonitrile and 1,3-butadiene, especially styrene-butadiene copolymers, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile Furthermore, the cathode may comprise a current collector which may be a metal wire, a metal grid, a metal web, a metal sheet, a metal foil or a metal plate. A suited metal foil is aluminum foil.

According to one embodiment of the present invention the cathode has a thickness of from 25 to 200 µm, preferably of from 30 to 100 µm, based on the whole thickness of the cathode without the thickness of the current collector.

The anode (C) comprised within the electrochemical of the present invention comprises an anode active material that can reversibly occlude and release lithium ions. Anode active materials that can be used include, without being limited to, carbonaceous material that can reversibly occlude and release lithium ions. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material is silicon which is able to occlude and release lithium ions. The silicon may be used in different forms, e.g. in the form of nanowires, nanotubes, nanoparticles, films, nanoporous silicon, powder of crystalline silicon or silicon nanotubes. The silicon may be deposited on a current collector. The current collector may be a metal wire, a metal grid, a metal web, a metal sheet, a metal foil or a metal plate. Preferred the current collector is a metal foil, e.g. a copper foil. Thin films of silicon may be deposited on metal foils by any technique known to the person skilled in the art, e.g. by sputtering techniques. One possibility of preparing Si thin film electrodes are described in R. Elazari et al.; Electrochem. Comm. 2012, 14, 21-24. It is also possible to use a silicon/carbon composite as anode active material according to the present invention. The carbon is preferably selected from conductive carbon materials like graphite, carbon black, carbon nanotubes, expanded graphite, graphene or mixtures thereof.

Other possible anode active materials are lithium ion intercalating oxides of Ti.

Preferably the anode active material present in the inventive lithium ion secondary battery is selected from carbonaceous material that can reversibly occlude and release lithium ions, particularly preferred the carbonaceous material that can reversibly occlude and release lithium ions is selected from crystalline carbon, hard carbon and amorphous carbon, in particular preferred is graphite. In another preferred embodiment the anode active material present in the inventive lithium ion secondary battery is selected from silicon that can reversibly occlude and release lithium ions, in particular silicon in form of thin films or silicon/carbon composites. In a further preferred embodiment the anode active material present in the inventive lithium ion secondary battery is selected from oxides of Ti which are able to occlude and release lithium ions. Further preference is given to lithium, lithium alloys and materials capable of forming lithium alloys.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example output conductors, separators, housings, cable connections etc. Output conductors may be configured in the form of a metal wire, metal grid, metal mesh, expanded, metal, metal sheet or metal foil. Suitable metal foils are especially aluminum foils. Suited separators are for example glass fiber separators and polymer-based separators like polyolefin separators. The housing may be of any shape, for example cuboidal or in the shape of a cylinder. In another embodiment, inventive electrochemical cells have the shape of a prism. In one variant, the housing used is a metal-plastic composite film processed as a pouch.

The present invention therefore also further provides for the use of inventive electrochemical cells in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers. The inventive electrochemical cells may also be used for stationary power storage.

The invention is illustrated by the following examples, which do not, however, restrict the invention.

Cell Preparation and Measurements:

Silicon thin film electrodes were prepared by DC magnetron sputtering (Angstrom Sciences Inc., USA) of n-type silicon (99.999%, Kurt J. Lesker, USA), at a pressure of about 5×10-3 Torr of argon (99.9995%), onto the roughened copper foil (Oxygenfree, SE-Cu58, Schlenk Metallfolien GmbH & Co. KG) to ensure adhesion of the silicon deposit to the current collector.

The Si electrodes were employed in a two electrodes configuration with coin-type cells (2032) vs. lithium metal (Chemetall). A glass-fiber filter separator (Whatmann GF/D) was used as the separator, which was soaked with 120 µl electrolyte. All cells were assembled in an argon-filled glove box (Unilab, MBraun) having oxygen and water levels below 0.1 ppm. Afterwards the test cells were transferred to a battery test station. Electrochemical cycling (discharging/charging) was done using a Maccor battery test system.

The water level of the tested electrolytes was below 20 ppm. The Si/lithium cells were discharged to a value of 2000 mAh/g in the first formation cycle, and then cycled between 0.17 and 0.9 V for repeated cycles at a C/10 rate. All measurements were carried out at room temperature (25° C.).

COMPARATIVE EXAMPLE 1

The comparative electrolyte composition contained 1 M $LiPF_6$ in a mixture of ethylene carbonate (EC)/diethylcarbonate (DEC)/monofluorinated ethylene carbonate (FEC) (3:6:1, by mass).

The results are shown in table 1.

INVENTIVE EXAMPLE 1: PROPIONIC ACID (1,1,1,3,3,3-HEXAFLUOROISOPROPYL)ESTER (HFIP—PR)

The electrolyte composition was the same as in comparative example 1 with the exception that the FEC was replaced by propionic acid (1,1,1,3,3,3-hexafluoroisopropyl)ester. The propionic acid (1,1,1,3,3,3-hexafluoroisopropyl)ester was prepared by adding 5 drops of concentrated $H_2SO_4$ to a solution of 84 g (0.5 mol) 1,1,1,3,3,3-Hexafluoroisopropanol in 170 mL propionic anhydride (exothermic reaction), followed by heating at reflux for 8 h. The mixture was fractionated two times (60 cm vigreux column) to yield 62 g (277 mmol, 55%) of a clear, colorless liquid (b.p.: 86° C.). For application in Li ion batteries the solvent was dried over molecular sieve (4 Å) and redistilled.

$^1$H NMR (300 MHz, $CDCl_3$): δ(ppm)=5.75 (hept, J=6.2, C—H), 2.50 (q, J=7.5, $CH_2$), 1.19 (t, J=7.5, $CH_3$).

$^{13}$C NMR (75 MHz, $CDCl_3$): δ(ppm)=170.1 (s, C=O), 120.4 (q, J=285.0, $CF_3$), 66.3 (hept, J=34.5, C—H), 26.5 (s, $CH_2$), 8.3 ($CH_3$).

$^{19}$F NMR (377 MHz, $CDCl_3$): δ(ppm)=−74.3 (d, J=6.2).

The results are shown in table 1.

TABLE 1

Discharge capacity of comparative and inventive examples 1

|  | capacity after 5 cycles | capacity after 25 cycles |
| --- | --- | --- |
| Comparative example 1 | 100% | 99.30% |
| Inventive example 1 | 100% | 99.90% |

The respective value after 5 cycles of the discharge capacity is taken as 100%-basis.

As can be seen from table 1, the cell of the inventive example 1 shows a better discharge capacity retention after 25 cycles than the cell of the comparative example 1.

COMPARATIVE EXAMPLE 2: NO FLUORINATED SOLVENT (1 M LIPF$_6$ IN (EC)/(EMC) (3:7, BY MASS))

The comparative electrolyte composition contained 1 M LiPF$_6$ in a mixture of ethylene carbonate (EC)/ethylmethylcarbonate (EMC) (3:7, by mass). The results of the cycling tests are shown in table 2.

COMPARATIVE EXAMPLE 3: (1,1,1,3,3,3-HEXAFLUOROISOPROPYL) ETHYL CARBONATE (HFIP-EC)

1,1,1,3,3,3-Hexafluoroisopropyl ethyl carbonate was prepared according to U.S. Pat. No. 3,359,296. The electrolyte composition contained 1 M LiPF$_6$ in a mixture of ethylene carbonate (EC)/diethylcarbonate (DEC)/(1,1,1,3,3,3-hexafluoroisopropyl) ethyl carbonate (3:6:1, by mass). The results of the cycling tests are shown in table 2.

INVENTIVE EXAMPLE 2: PROPIONIC ACID (1,1,1,3,3,3-HEXAFLUOROISOPROPYL)ESTER (HFIP—PR)

The electrolyte composition was the same as in comparative example 3 with the exception that the HFiP-EC was replaced by (1,1,1,3,3,3-hexafluoroisopropyl) ethyl carbonate, i.e. the electrolyte composition contained 1 M LiPF$_6$ in a mixture of ethylene carbonate (EC)/diethylcarbonate (DEC)/(1,1,1,3,3,3-hexafluoroisopropyl) ethyl carbonate (3:6:1, by mass). The results of the cycling tests are shown in table 2.

INVENTIVE EXAMPLE 3: (1,1,1,3,3,3-HEXAFLUOROISOPROPYL) ACETATE (HFIP—AC)

1,1,1,3,3,3-Hexafluoroisopropyl acetate was prepared according to H. J. Kotzsch, Chem. Ber. 1966, 1143-1148. The electrolyte composition was the same as in comparative example 3 with the exception that the HFiP-EC was replaced by (1,1,1,3,3,3-hexafluoroisopropyl) acetate, i.e. the electrolyte composition contained 1 M LiPF$_6$ in a mixture of ethylene carbonate (EC)/diethylcarbonate (DEC)/(1,1,1,3,3,3-hexafluoroisopropyl) acetate (3:6:1, by mass). The results of the cycling tests are shown in table 2.

INVENTIVE EXAMPLE 4: DI-(1,1,1,3,3,3-HEXAFLUOROISOPROPYL) OXALATE (HFIP—OX)

Bis(1,1,1,3,3,3-hexafluoroisopropyl) oxalate was prepared according to J. J. Parlow, D. A. Mischke, S. S. Woodard, J. Org. Chem. 1997, 62, 5908-5919. The electrolyte composition was the same as in comparative example 3 with the exception that the HFiP-EC was replaced by (1,1,1,3,3,3-hexafluoroisopropyl) acetate, i.e. the electrolyte composition contained 1 M LiPF$_6$ in a mixture of ethylene carbonate (EC)/diethylcarbonate (DEC)/(1,1,1,3,3,3-hexafluoroisopropyl) acetate (3:6:1, by mass). The results of the cycling tests are shown in table 2.

TABLE 2

| | Discharge capacity | |
|---|---|---|
| | capacity after 10 cycles | capacity after 40 cycles |
| Comp. Ex. 2: 1M LiPF$_6$ in (EC/EMC) (3:7) | 100% | 94.2% |
| Comp. Ex. 3: 1M LiPF$_6$ in (EC/DEC/HFiP-EC) (3:6:1) | 100% | 97.6% |
| Inv. Ex. 2: 1M LiPF$_6$ in (EC/DEC/HFiP-Pr) (3:6:1) | 100% | 98.1% |
| Inv. Ex. 3: 1M LiPF$_6$ in (EC/DEC/HFiP-Ac) (3:6:1) | 100% | 97.8% |
| Inv. Ex. 4: 1M LiPF$_6$ in (EC/DEC/HFiP-Ox) (3:6:1) | 100% | 98.6% |

The respective value after 10 cycles of the discharge capacity is taken as 100%-basis.

The addition of 10 wt.-% fluoroisopropyl derivative improves the cycling performance of Si anode materials when compared to the standard electrolyte 1M LiPF$_6$ in (EC/EMC) (3:7).

COMPARATIVE EXAMPLE 4: (1,1,1,3,3,3-HEXAFLUOROISOPROPYL) ETHYL CARBONATE (HFIP-EC)

The electrolyte composition contained 1 M LiPF$_6$ in a mixture of ethylmethylcarbonate (EMC) and (1,1,1,3,3,3-hexafluoroisopropyl) ethyl carbonate (1:1, by mass). The results of the cycling tests are shown in table 3.

INVENTIVE EXAMPLE 5: PROPIONIC ACID (1,1,1,3,3,3-HEXAFLUOROISOPROPYL)ESTER (HFIP—PR)

The electrolyte composition was the same as in comparative example 4 with the exception that (1,1,1,3,3,3-hexafluoroisopropyl) ethyl carbonate was replaced by propionic acid (1,1,1,3,3,3-hexafluoroisopropyl)ester, i.e. the electrolyte composition contained 1 M LiPF$_6$ in a mixture of ethylmethylcarbonate (EMC) and propionic acid (1,1,1,3,3,3-hexafluoroisopropyl)ester (1:1, by mass). The results of the cycling tests are shown in table 3.

INVENTIVE EXAMPLE 6: (1,1,1,3,3,3-HEXAFLUOROISOPROPYL) ACETATE (HFIP—AC)

The electrolyte composition was the same as in comparative example 4 with the exception that (1,1,1,3,3,3-hexafluoroisopropyl) ethyl carbonate was replaced by 1,1,1,3,3,3-hexafluoroisopropyl) acetate, i.e. the electrolyte composition contained 1 M LiPF$_6$ in a mixture of ethylmethylcarbonate (EMC) and 1,1,1,3,3,3-hexafluoroisopropyl) acetate (1:1, by mass). The results of the cycling tests are shown in table 3.

TABLE 3

| | Discharge capacity | |
|---|---|---|
| | capacity after 10 cycles | capacity after 40 cycles |
| Comp. Ex. 4: 1M LiPF$_6$ in (EMC/HFiP-EC) (1:1) | 100% | 68.9% |
| Inv. Ex. 5: 1M LiPF$_6$ in (EMC/HRP-Pr) (1:1) | 100% | 74.9% |

TABLE 3-continued

| | Discharge capacity | |
|---|---|---|
| | capacity after 10 cycles | capacity after 40 cycles |
| Inv. Ex. 6: 1M LiPF$_6$ in (EMC/HFiP-Ac) (1:1) | 100% | 86.0% |

The respective value after 10 cycles of the discharge capacity is taken as 100%-basis.

The electrolyte composition containing (1,1,1,3,3,3-hexafluoroisopropyl) ethyl carbonate shows clearly larger decrease of the capacity during cycling than the electrolyte compositions containing propionic acid (1,1,1,3,3,3-hexafluoroisopropyl)ester or 1,1,1,3,3,3-hexafluoroisopropyl) acetate.

The invention claimed is:

1. An electrolyte composition (A) comprising:
(i) from 39.9 to 99.9 wt.-% of at least one aprotic organic solvent based on the total weight of the electrolyte composition;
(ii) from 0.1 to 25 wt.-% of at least one conducting salt based on the total weight of the electrolyte composition, the at least one conducting salt selected from the group consisting of:
Li[F$_{6-x}$P(C$_y$F$_{2y+1}$)$_x$], wherein x is an integer in the range from 0 to 6 and y is an integer ranging from 1 to 20,
Li[B(R$^2$)$_4$], Li[B(R$^2$)$_2$(OR$^3$O)] and Li[B(OR$^3$O)$_2$], wherein each R$^2$ is independently from each other selected from F, Cl, Br, I, C$_1$-C$_4$ alkyl, C$_2$-C$_4$ alkenyl, and C$_2$-C$_4$ alkinyl, wherein alkyl, alkenyl, and alkinyl may be substituted by one or more OR$^4$, wherein R$^4$ is selected from C$_1$-C$_6$ alkyl, C$_2$-C$_6$ alkenyl, and C$_2$-C$_6$ alkinyl, and
(OR$^3$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom,
salts of the general formula Li[X(C$_n$F$_{2n+1}$SO$_2$)$_m$], where m and n are defined as follows:
m=1, when X is selected from oxygen and sulfur,
m=2, when X is selected from nitrogen and phosphorus,
m=3, when X is selected from carbon and silicon, and n is an integer ranging from 1 to 20,
LiClO$_4$, LiAsF$_6$, LiCF$_3$SO$_3$, Li$_2$SiF$_6$, LiSbF$_6$, LiAlCl$_4$, lithium tetrafluoro (oxalato) phosphate, and lithium oxalate;
(iii) from 0.001 to 60 wt.-% of at least one compound of formula (I) based on the total weight of the electrolyte composition:

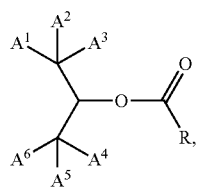

(I)

wherein
A$^1$, A$^2$, A$^3$, A$^4$, A$^5$, and A$^6$ are F;
R is selected from R$^1$, OR$^1$, and C(O)OR$^1$, and
R$^1$ is selected from C$_1$-C$_6$ alkyl, C$_3$-C$_6$ cycloalkyl, C$_2$-C$_6$ alkenyl, C$_3$-C$_6$ cycloalkenyl, C$_5$-C$_7$ (hetero) aryl, and C$_2$-C$_6$ alkinyl, wherein alkyl, cycloalkyl, alkenyl, cycloalkenyl, (hetero)aryl, and alkinyl may be substituted by one or more F
(iv) from 0 to 10 wt.-% of the at least one further additive, based on the total weight of the electrolyte composition.

2. The electrolyte composition (A) according to claim 1, wherein R is C(O)OR$^1$, where R$^1$ is 2-propyl which is substituted in 1- and/or 3-position by at least 1 up to 6 F.

3. The electrolyte composition (A) according to claim 1, wherein the compound of formula (I) is selected from the group consisting of di-(1,1,1,3,3,3-hexafluoro-2-propyl)oxalate, (1,1,1,3,3,3-hexafluoro-2-propyl)acetate, and propionic acid (1,1,1,3,3,3-hexafluoroisopropyl)ester.

4. The electrolyte composition (A) according to claim 1, wherein the aprotic organic solvent (i) is at least one selected from the group consisting of:
(a) cyclic and noncyclic organic carbonates, which may be partly halogenated,
(b) di-C$_1$-C$_{10}$-alkylethers, which may be partly halogenated,
(c) di-C$_1$-C$_4$-alkyl-C$_2$-C$_6$-alkylene ethers and polyethers, which may be partly halogenated,
(d) cyclic ethers, which may be partly halogenated,
(e) cyclic and acyclic acetales and ketales, which may be partly halogenated,
(f) orthocarboxylic acids esters, which may be partly halogenated,
(g) cyclic and noncyclic esters of carboxylic acids, which may be partly halogenated,
(h) cyclic and noncyclic sulfones, which may be partly halogenated,
(i) cyclic and noncyclic nitriles and dinitriles, which may be partly halogenated, and
(j) ionic liquids, which may be partly halogenated.

5. The electrolyte composition (A) according to claim 1, wherein the at least one additive (iv) is selected from the group consisting of vinylene carbonate and its derivatives, vinyl ethylene carbonate and its derivatives, methyl ethylene carbonate and its derivatives, lithium (bisoxalato) borate, lithium difluoro (oxalato) borate, lithium tetrafluoro (oxalato) phosphate, lithium oxalate, 2-vinyl pyridine, 4-vinyl pyridine, cyclic exo-methylene carbonates, sultones, organic esters of inorganic acids, acyclic and cyclic alkanes having a boiling point at 1 bar of at least 36° C., and aromatic compounds, optionally halogenated cyclic and acyclic sulfonylimides, optionally halogenated cyclic and acyclic phosphate esters, optionally halogenated cyclic and acyclic phosphines, optionally halogenated cyclic and acyclic phosphites, optionally halogenated cyclic and acyclic phosphazenes, optionally halogenated cyclic and acyclic silylamines, optionally halogenated cyclic and acyclic halogenated esters, optionally halogenated cyclic and acyclic amides, optionally halogenated cyclic and acyclic anhydrides, and optionally halogenated organic heterocycles.

6. An electrochemical cell comprising:
(A) the electrolyte composition according to claim 1,
(B) at least one cathode comprising at least one cathode active material, and
(C) at least one anode comprising at least one anode active material.

7. The electrochemical cell according to claim 6, wherein the electrochemical cell is a lithium ion battery.

8. The electrochemical cell according to claim 6, wherein the at least one cathode active material comprises a material capable of occluding and releasing lithium ions selected from lithiated transition metal phosphates of olivine structure; lithium ion intercalating transition metal oxides with layer structure; and lithiated transition metal mixed oxides of spinel structure.

9. The electrochemical cell according to claim 6, wherein the at least one cathode active material is selected from the group consisting of $LiCoPO_4$, transition metal oxides with layer structure of general formula $Li_{(1+z)}[Ni_aCo_bMn_c]_{(1-z)}O_{2+e}$, wherein z is 0 to 0.3, a, b and c may be same or different and are independently 0 to 0.8 wherein a+b+c=1; and $-0.1 \le e \le 0.1$, and lithiated transition metal mixed oxides of spinel structure of general formula $Li_{1+t}M_{2-t}O_{4-d}$, wherein d is 0 to 0.4, t is 0 to 0.4, while more than 60 mol % of M is manganese and further M's, from which not more than 30 mol % is chosen, are one or more metals from groups 3 to 12 of the periodic table.

10. The electrochemical cell according to claim 6, wherein the anode active material comprises a material capable of occluding and releasing lithium ion selected from the group consisting of carbonaceous material, oxides of Ti, silicon, lithium, lithium alloys and materials capable of forming lithium alloys.

11. The electrolyte composition (A) according to claim 1, which can transfer ions in an electrochemical reaction in an electrochemical cell that comprises an anode, a cathode, and the electrolyte composition (A).

* * * * *